United States Patent
Ito et al.

(10) Patent No.: US 7,567,487 B2
(45) Date of Patent: Jul. 28, 2009

(54) CONTENT MOVING DEVICE, CONTENT MOVING METHOD, COMPUTER PROGRAM, RECORDING MEDIUM, AND CONTENT MOVING SYSTEM

(75) Inventors: Yoshikatsu Ito, Osaka (JP); Masaya Miyazaki, Osaka (JP); Motoji Ohmori, Osaka (JP); Shunji Harada, Osaka (JP); Kaoru Yokota, Hyogo (JP); Toshihisa Nakano, Osaka (JP); Jun Takahashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 387 days.

(21) Appl. No.: 10/591,845

(22) PCT Filed: Mar. 23, 2005

(86) PCT No.: PCT/JP2005/005253

§ 371 (c)(1),
(2), (4) Date: Sep. 5, 2006

(87) PCT Pub. No.: WO2005/091150

PCT Pub. Date: Sep. 29, 2005

(65) Prior Publication Data

US 2007/0274179 A1    Nov. 29, 2007

(30) Foreign Application Priority Data

Mar. 23, 2004    (JP)    ............................. 2004-085364

(51) Int. Cl.
*G11B 5/09*    (2006.01)

(52) U.S. Cl. .............. 369/47.12; 369/47.15; 369/59.23; 369/59.1

(58) Field of Classification Search ...................... None
See application file for complete search history.

(56) References Cited

U.S. PATENT DOCUMENTS

| 2002/0143807 A1 | 10/2002 | Komatsu | |
| 2005/0007925 A1* | 1/2005 | Shitara et al. | 369/53.21 |
| 2005/0265193 A1* | 12/2005 | Phillipo et al. | 369/53.21 |

FOREIGN PATENT DOCUMENTS

| EP | 1 045 388 | 10/2000 |
| EP | 1 248 433 | 10/2002 |
| EP | 1 333 674 | 8/2003 |
| JP | 2000-347946 | 12/2000 |
| JP | 2002-278859 | 9/2002 |
| JP | 2003-228522 | 8/2003 |
| JP | 2004-005816 | 1/2004 |

* cited by examiner

*Primary Examiner*—Muhammad N. Edun
(74) *Attorney, Agent, or Firm*—Wenderoth, Lind & Ponack, L.L.P.

(57) ABSTRACT

To provide a highly user-friendly content moving device which prevents unauthorized copying of content and, when content that has been irreversibly converted and moved to a recording medium is moved back to a move source, can use the content in its form before irreversible conversion. A partial information extraction unit extracts, from content stored on a content storage unit, partial data necessary for playback of the content, and a write/read unit writes the partial data to a partial information storage unit and overwrites a portion of the content corresponding to the partial data with different data, while a conversion unit transcodes the content and writes the transcoded content and the partial data to the recording medium.

18 Claims, 11 Drawing Sheets

CONTENT MOVING DEVICE, CONTENT MOVING METHOD, COMPUTER PROGRAM, RECORDING MEDIUM, AND CONTENT MOVING SYSTEM

BACKGROUND OF THE INVENTION

1. Technical Field

The present invention relates to a content moving system which includes a content moving device and a recording medium, and in particular to a technique for preventing unauthorized use of content and improving user-friendliness.

2. Background Art

In recent years, digital content (hereafter, "content") such as movies have been widely distributed using BS digital broadcasting, terrestrial digital broadcasting, etc.

Given that copying content is easy and does not result in degraded quality, copy control information (CCI), which is for performing control of content copying and copy generation management with the goal of copyright protection, is attached to the content.

For example, if the CCI is set to "Copy One Generation" which indicates that copying of a content is permitted only one time, and the content is copied, the resulting copied content will have copy control information set to "Copy No More" which indicates that copying is not possible.

If the CCI is set to "Copy No More," the content cannot be copied to another recording medium or device, although it is possible to move the content while protecting a copyright (ref. Japanese Patent Application Publication No. 2003-228522).

The above corresponds to a case of moving a content recorded on a HDD (Hard Disk Drive) built into a digital television to an SD card. After moving the content, it is necessary to disable use of the content everywhere except on the SD card by erasing the content recorded on the HDD.

Also, if the content is high-definition and large in size, and the recording volume of the destination SD card is smaller than the content, the content is often converted to low-definition to reduce the size before being moved.

BRIEF SUMMARY OF THE INVENTION

Problems Solved by the Invention

However, once the content is moved to a destination with a small recording volume, even if the content is moved back to the source HDD which has a large recording volume, only playback of the low-definition content is possible, which is disadvantageous for the user.

In view of the above problem, an object of the present invention is to provide a highly user-friendly content moving device, content moving method, computer program, recording medium, and content moving system which prevent unauthorized copying and, if a moved content which has been irreversibly converted is moved back to the move source, can restore the pre-conversion content on the move source.

Means to Solve the Problem

In order to solve the above problem, the present invention is a content moving device for moving stored content to a portable recording medium. The content moving device includes a storage unit storing original content; a generation unit operable to perform irreversible conversion on the original content, which lowers a quality thereof, to generate converted content; an extraction unit operable to extract partial data which is part of the original content; a replacing unit operable to replace a portion of the original content corresponding to the extracted partial data with different data; and a write unit operable to write the converted content and the extracted partial data to the recording medium.

EFFECTS OF THE INVENTION

By having the aforementioned structure, the content moving device of the present invention can disable content stored in the storage unit so it cannot be played, and make only the converted content recorded on the recording medium playable in order to protect a copyright.

Also, if the partial data is written back to the disabled portion of the content stored in the storage unit, and the converted content recorded on the recording medium is erased, the content in the content moving device can be restored to its state before being moved to the recording medium while protecting a copyright.

Also, the extraction unit may extract the partial data which is of a predetermined length and from a predetermined position in the original content.

According to this structure, it is possible to make the content unplayable since data of a given length from a given location in the content can be disabled.

For example, if control data necessary for playback is included in the data portion of the given length from the given location, playback of the content becomes impossible.

Also, the original content may include at least intraframe-coded compressed frame images, and the extraction unit may extract part or all of the intraframe-coded compressed frame images as the partial data.

According to this structure, complete playback of the content is made impossible and a copyright can be reliably protected since part or all of the intraframe-coded compressed frame images have been extracted.

If interframe-coded compressed frame images are also included in the extracted data, it is possible to also make the intraframe-coded compressed frame images unplayable by making the interframe-coded compressed frame images unplayable.

Also, the original content may be composed of a plurality of fixed length data blocks, the extraction unit may extract a single data block from the plurality of data blocks, judge whether part of the intraframe-coded compressed frame images is included in the extracted data block, and if included, output the extracted data block as the partial data, and the replacing unit may replace the portion of the original content corresponding to the extracted data block with different data.

According to this structure, it is possible to reliably disable a data block pertaining to interframe-coded compressed frame images.

Also, the data blocks constituting the original content may be generated by encrypting a digital copyrighted work per the fixed length. The extraction unit may include a decryption subunit operable to decrypt the extracted data block to generate a decrypted data block, and a judging subunit operable to judge whether part of the intraframe-coded compressed frame images is included in the decrypted data block, and if included, output the extracted data block as the partial data. The replacing unit may replace the portion of the original content corresponding to the decrypted data block judged to include the part of the intraframe-coded compressed frame images with different data.

According to this structure, it is possible to reliably disable a data block pertaining to interframe-coded compressed frame images in an encrypted digital copyrighted work.

Also, the write unit, instead of writing the partial data to the recording medium, may further encrypt, using a medium key of the recording medium, the decrypted data block judged to include part of the intraframe-coded compressed frame images, and write the encrypted data block to the recording medium.

According to this structure, it is possible to reliably protect a copyright since decrypted data blocks are encrypted and written to the recording medium.

Also, the write unit may include a key holding subunit operable to hold the medium key, an encryption subunit operable to encrypt the decoded data block using the medium key, a write subunit operable to write the encrypted data block and the medium key to the recording medium, and a key erasing subunit operable to erase the medium key held in the key holding subunit.

According to this structure, it is possible to make unauthorized use of the content even more difficult by having separate keys used in the encryption of extracted decrypted data blocks and the encryption of data extracted from the content.

Also, the extraction unit may further output a position in the original content of the extracted partial data, and the write unit may further write the position of the extracted partial data to the recording medium.

According to this structure, it is possible to easily restore the disabled content by writing the partial data back to the position in the content since the position of the partial data in the content is written to the recording medium.

Also, in the content moving device which is operable to move converted content recorded on the recording medium to the content moving device, the recording medium may have recorded thereon the converted content and the partial data, and the storage unit may have stored therein replaced content which is the original content in which the portion corresponding to the partial data has been replaced with different data. The content moving device may further include a read unit operable to read the partial data from the recording medium having the converted content and the partial data recorded thereon, a re-replacing unit operable to replace the replaced portion with the partial data read by the read unit, and an erase unit operable to erase the partial data and the converted content from the recording medium.

According to this structure, given that the partial data is written back to the disabled portion of the content stored in the storage unit and the converted content recorded on the recording medium is erased, it is possible to restore the pre-move content in the content moving device while protecting a copyright.

Also, the portion which is of a predetermined length from a predetermined position of the replaced content stored in the storage unit may have been replaced with different data, and the re-replacing unit may replace the portion which is of the predetermined length from the predetermined position of the replaced content with the read partial data.

According to this structure, it is possible to easily restore the disabled content by writing the partial data of a predetermined length to the predetermined position in the content.

Also, the replaced content may be composed of a plurality of fixed length data blocks, the data block corresponding to the portion which is of the predetermined length from the predetermined position of the replaced content stored in the storage unit may have been replaced with different data, the partial data may be a single data block from the plurality of data blocks, and the re-replacing unit may replace the replaced data block with the read partial data.

According to this structure, it is possible to reliably disable the data blocks of a given length by handling the content as blocks.

Also, the data blocks constituting the replaced content may be generated by encrypting a digital copyrighted work per the fixed length, and the recording medium may have recorded thereon reencrypted data generated by decrypting the extracted partial data and encrypting the decrypted partial data using the medium key of the recording medium. The read unit, instead of reading the partial data from the recording medium, may read the reencrypted data, and the re-replacing unit, instead of replacing the replaced data block of the replaced content with the read partial data, may decrypt the reencrypted data using the medium key, perform encryption, being the same as an encryption performed on the digital copyrighted work, on the decrypted data to generate the partial data, and replace the replaced data block of the replaced content with the generated partial data.

Also, the medium key may be stored on the recording medium. The re-replacing unit may include a key reading subunit operable to read the medium key from the recording medium; a decryption subunit operable to decrypt the reencrypted data using the medium key; an encryption subunit operable to perform encryption, which is the same as the encryption performed on the digital copyrighted work, on the decrypted data to generate the partial data; a replacing subunit operable to replace the replaced data block with the generated partial data; and a key erase subunit operable to erase the medium key stored on the recording medium.

According to this structure, it is possible to handle encrypted content and strengthen the protection of a copyright.

Also, the recording medium may further have stored thereon a position of the partial data in the replaced content, the read unit may further read the position from the recording medium, and the re-replacing unit may replace data of the replaced content stored in the storage unit with the read partial data, the data being at the position.

According to this structure, it is possible to easily restore the disabled content by reading the partial data and the position in the content of the partial data, which were written to the recording medium, and writing the partial data to the position in the content.

A content moving method of the present invention is used with a storage unit with content stored therein and is used in a content moving device for moving the content to a portable recording medium. The content moving method includes the steps of generating converted content by performing irreversible conversion on the content, which lowers a quality thereof, extracting partial data, being part of the content, replacing a portion of the content corresponding to the extracted partial data with different data, and writing the converted content and the extracted partial data to the recording medium.

According to this structure, it is possible to disable content stored in the storage unit so as playback is impossible, and to make only the converted content recorded on the recording medium playable to protect a copyright.

Also, if the partial data is written back to the disabled portion of the content stored in the storage unit and the converted content recorded on the recording medium is erased, it is possible to restore the pre-move content in the content moving device while protecting a copyright.

A computer program of the present invention is used with a storage unit with content stored therein and is used in a content moving device for moving the content to a portable recording medium. The computer program performs the steps of generating converted content by performing irreversible conversion on the content, which lowers a quality thereof, extracting partial data which is part of the content, replacing a portion of the content corresponding to the extracted partial data with different data, and writing the converted content and the extracted partial data to the recording medium.

A recording medium of the present invention is computer-readable and has the above computer program recorded thereon.

According to this structure, it is possible to disable content stored in the storage unit so playback is impossible, and to make only the converted content recorded on the recording medium playable to protect a copyright.

Also, if the partial data is written back to the disabled portion of the content stored in the storage unit and the converted content recorded on the recording medium is erased, it is possible to restore the pre-move content in the content moving device while protecting a copyright.

A recording medium of the present invention may also be a recording medium having recorded thereon converted content which is a content irreversibly converted to lower a quality thereof, and partial data extracted from the content.

A content moving system of the present invention is composed of a portable recording medium and a content moving device for moving stored content to the recording medium. Here, the content moving device includes a storage unit storing the content; a generation unit operable to perform irreversible conversion on the content, which lowers a quality thereof, to generate converted content; an extraction unit operable to extract partial data, being part of the content; a replacing unit operable to replace a portion of the content corresponding to the extracted partial data with different data; and a write unit operable to write the converted content and the extracted partial data to the recording medium. A storage area for storing therein the converted content and the partial data is provided in the recording medium.

According to this structure, it is possible to disable content stored in the storage unit so playback is impossible, and to make only the converted content recorded on the recording medium playable to protect a copyright.

Also, if the partial data is written back to the disabled portion of the content stored in the storage unit, and the converted content recorded on the recording medium is erased, it is possible to restore the pre-move content in the content moving device while protecting a copyright.

Figure 1:
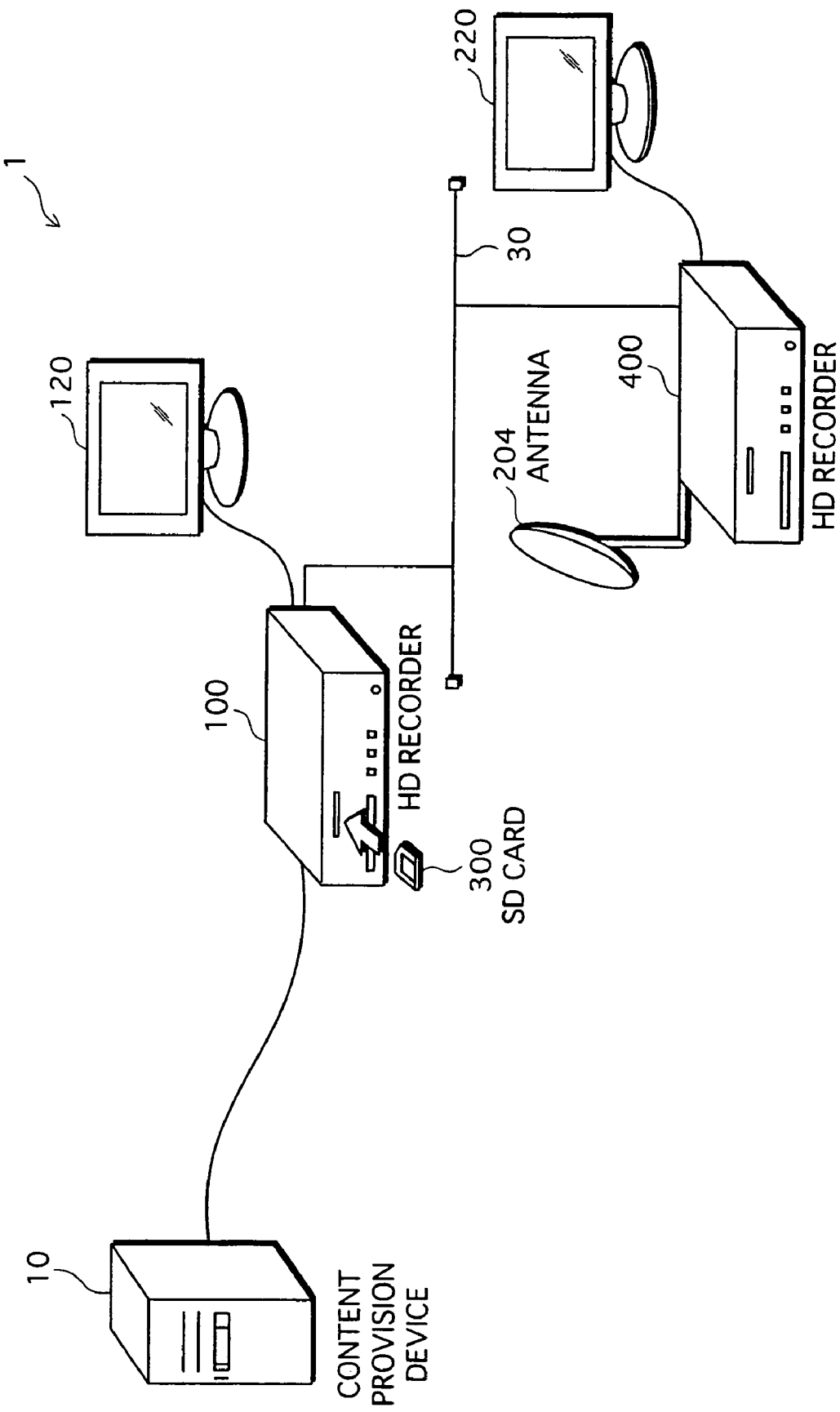
FIG. 1 shows an overall construction of a content record/playback system pertaining to an embodiment of the present invention.

DESCRIPTION OF THE CHARACTERS 1 content record/playback system
10 content provision device
30 network
100 HD recorder
101 device-record-key storage unit
102 content reception unit
103 encryption unit
104 content storage unit
105 encrypted content read unit
106 decryption unit
107 conversion unit
108 medium-record-key generation unit
109 encryption unit
110 partial information extraction unit
111 encryption unit
112 decryption unit
113 control unit
114 playback control unit
115 authentication unit
116 write/read unit
117 operation instruction acquisition unit
118 partial information extraction unit
120 monitor
300 SD card
301 authentication unit
302 converted content storage unit
303 medium-record-key storage unit
304 partial information storage unit
310 authentication unit
311 transmission/reception unit

DETAILED DESCRIPTION OF THE INVENTION

An embodiment of the present invention is described below along with exemplary drawings.

Embodiment 1

A content record/playback system of a first embodiment pertaining to the present invention is described below with reference to the drawings.

Overview of Content Record/Playback System 1

As shown in FIG. 1, the content record/playback system 1 of the present invention includes a content provision device 10, a hard disk recorder (hereafter, HD recorder) 100, an SD card 300 for insertion into the HD recorder 100, and an HD recorder 400. The content provision device 10 and the HD recorder 100 are connected via the Internet, and the HD recorder 100 and the HD recorder 400 are connected by a network 30 which is based on IEEE1394.

The HD recorder 100 receives content including video data, audio data, and control data transmitted from the content provision device 10, and stores the received content on its internal hard disk.

The content is a transport stream (hereafter, TS) created based on the MPEG2 (Moving Picture Experts Group 2) specification, and includes CCI (Copy Control Information) set to Copy One Generation.

The HD recorder 100 can store the received content on its internal hard disk, although in this case, the CCI is reset to "Copy No More" before being stored, which indicates that copying is not possible.

Also, the HD recorder 100 cannot copy the acquired content to the inserted SD card 300, although it is possible to perform a move. It is not possible, however, to store the content as is in the storage area of the SD card 300 since this storage area is smaller than the storage area of the hard disk in the HD recorder 100.

In this case, the HD recorder 100 transcodes the high-definition content based on the MPEG2 specification to low-definition content based on the high-compression-rate MPEG4 specification, and records the content on the SD card 300 once its data volume has been reduced. The HD recorder 100 also retains the high quality MPEG2 content, but disables it to make it unusable.

It is possible for the HD recorder 100 to move the content on the SD card 300 back to its internal hard disk and play back the content, although in this case as well, the same high-definition content as before the move is played back, rather than the low-definition content.

Structure of the HD Recorder 100

Figure 2:
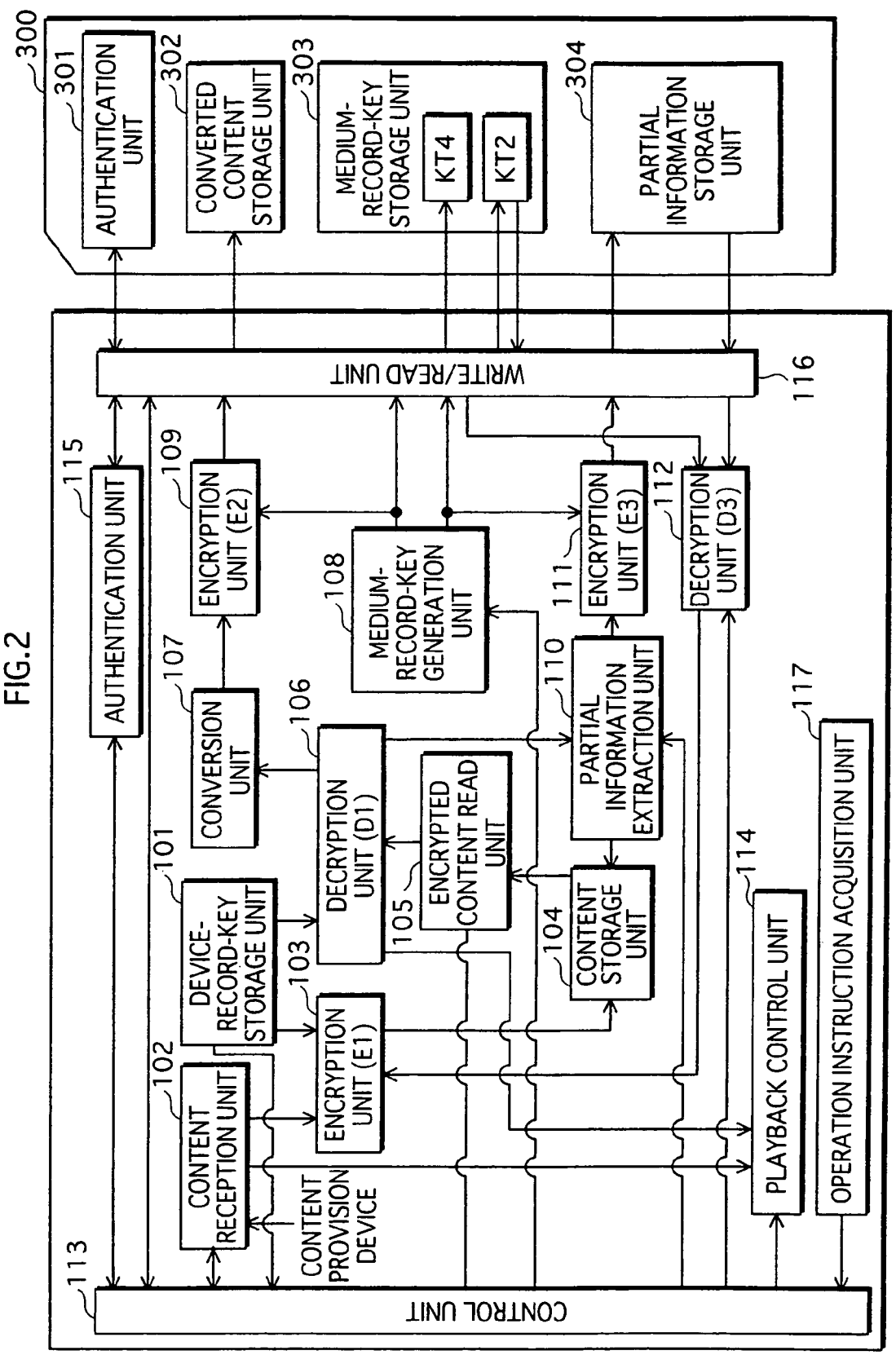
FIG. 2 is a block diagram showing a construction of an HD recorder and an SD card pertaining to the embodiment of the present invention.

As shown in FIG. 2, the HD recorder 100 is constituted from a device-record-key storage unit 101, a content reception unit 102, an encryption unit 103, a content storage unit 104, an encrypted content read unit 105, a decryption unit 106, a conversion unit 107, a medium-record-key generation unit 108, an encryption unit 109, a partial information extraction unit 110, an encryption unit 111, a decryption unit 112, a control unit 113, a playback control unit 114, an authentication unit 115, a write/read unit 116, and an operation instruction acquisition unit 117.

The HD recorder 100 is specifically a computer system constituted from a microprocessor, ROM, RAM, a hard disk unit, etc., with a computer program stored in the RAM or the hard disk unit. The HD recorder 100 achieves its functions as the microprocessor operates in accordance with the computer program.

The device-record-key storage unit 101 is constituted from ROM and stores a device-record-key K1, being key information specific to the HD recorder 100, and a device identifier "ID_A." The device-record-key storage unit 101 also includes a protection mechanism and is protected from unauthorized external access.

The device-record-key and the device identifier are written in advance to the device-record-key storage unit 101 before shipping.

The content reception unit 102 securely receives content and content identification information (hereafter, CID), which identifies the content, from a content provision device 10 in accordance with a protocol specified by the DTCP (Digital Transmission Content Protection) standard, and transmits the received content and the CID to the encryption unit 103.

The DTCP standard is not mentioned in detail since it is feasible with a known technology.

The TS, being the content received by the content reception unit 102, is constituted from, for example, an M number (M being a natural number) of TS packets (hereafter, TSP) from TSP(1) to TSP (M).

The content reception unit 102 receives the M number of TSPs one by one and in order from TSP(1) to TSP (M), and outputs each TSP to the encryption unit 103 upon reception.

Also, the content reception unit 102 extracts, based on the MPEG2 specification, control data necessary for video playback such as a PAT (Program Association Table), PMTs (Program Map Table), etc. from the TS. The content reception unit 103 references the extracted PAT, PMTs, etc., reads a VPID, being a packet ID (hereafter, PID) from data regarding video signals, and notifies the control unit 113 of the VPID.

If a device-record-key read instruction is received from the control unit 113, the encryption unit 103 reads the device-record-key from the device-record-key storage unit 101, and encrypts the TSPs inputted from the content reception unit 102 to processing block units, being data of a predetermined byte count. The encryption unit 103 then correlates encrypted blocks, being encrypted processing blocks, and the CID inputted from the content reception unit 102, and writes the encrypted blocks and the CID to the content storage unit 104.

The encryption unit 103 performs the above encryption by running an encryption algorithm E1 on the processing blocks using the device-record-key.

Here, a processing block is assumed to be 512 bytes long.

Figure 3:
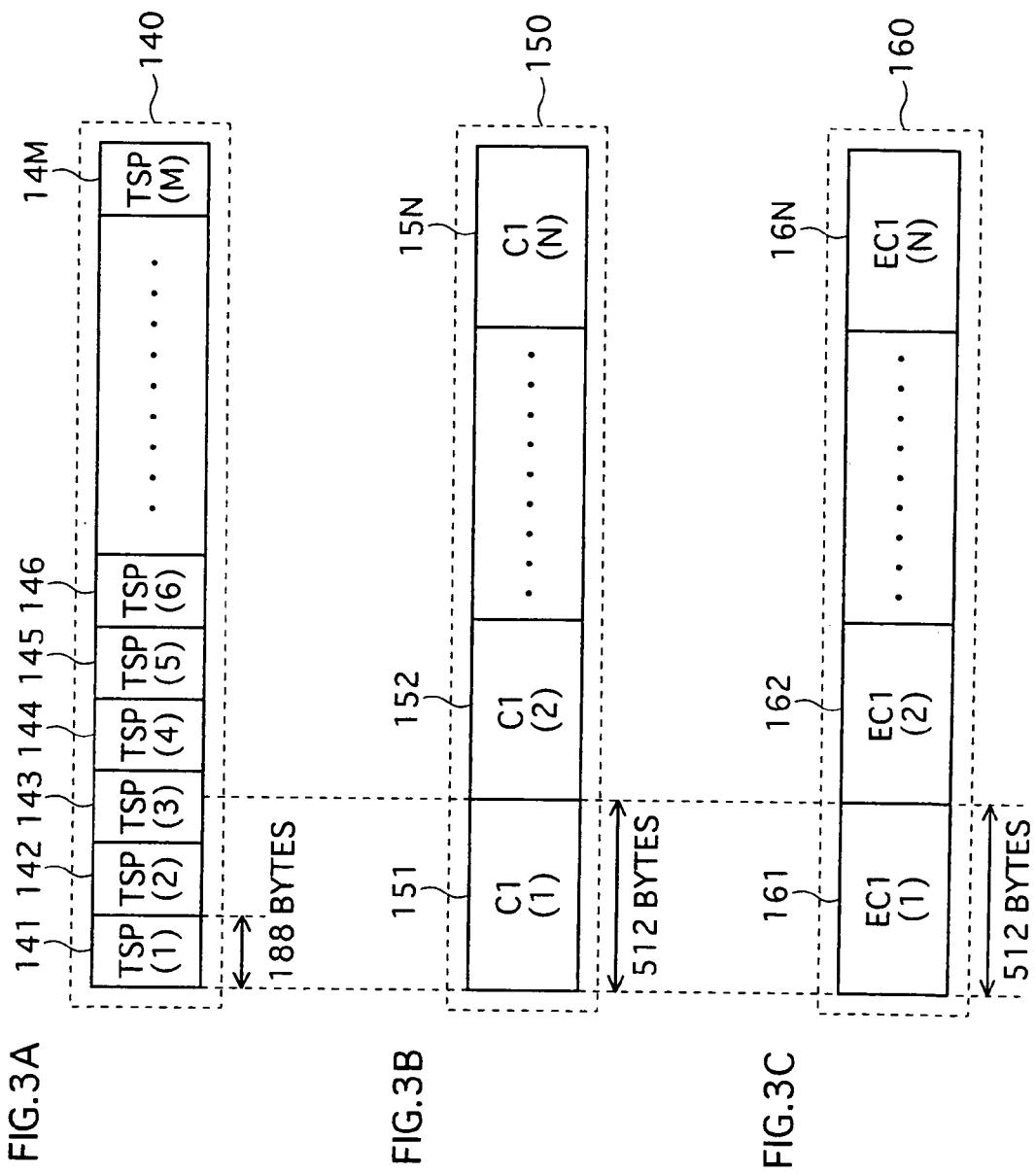
FIG. 3 shows an exemplary data structure of a content.

If, for example, an M number of TSPs (M being a natural number) are inputted from the content reception unit 102 in order from TSP(1) to TSP(M) as shown in FIG. 3A, the encryption unit 103 breaks the inputted TSPs into 512-byte-long processing blocks 151 to 15N (N being a natural number), as shown in FIG. 3B, and encrypts each processing block.

A processing block 151 is composed from the 188-byte TSP(1), the 188-byte TSP(2), and the first 136 bytes of the TSP(3). A processing block 152 is composed from the last 52 bytes of TSP(3), the 188-byte TSP(4), the 188-byte TSP(5), and the first 84 bytes of the TSP(6).

Hereafter, the processing block 151 and the processing block 152 are referred to as C1(1) and C1(2), respectively. Similarly, the processing block 15N is referred to as C1(N).

The encryption unit 103 runs, for example, the encryption algorithm E1 on C1(1) using the device-record-key in order to generate an encrypted block EC1(1), maps the generated EC1(1) with the CID pertaining to the encrypted block, and writes EC1(1) to the content storage unit 104.

Similarly to the above C1(1), the encryption unit 103 encrypts the TS shown in FIG. 3A to processing blocks as shown in FIG. 3B, and writes the resulting encrypted blocks 161 to 16N (N being a natural number) to the content storage unit 104. An encrypted block 161 (EC1(1)) is the processing block 151 (C1(1)) that was encrypted, an encrypted block 162 (EC1(2)) is the processing block 152 (C1(2)), and an encrypted block 16N (EC1(N)) is the processing block 15N (C1(N)) that was encrypted.

In the following, positions of the processing and encrypted blocks are represented by block numbers.

For example, the block number for C1(2) is "2," the block number for C1(3) is "3," and the block number for C1(N) is "N." Similarly, the block number for EC1(2) is "2," the block number for EC1(3) is "3," and the block number for C1(N) is "N."

The encryption unit 103 is able to receive, from the decryption unit 112, concatenated data consisting of a CID, a block number, and a processing block. If concatenated data is received, the encryption unit 103 runs the encryption algorithm E1 on the processing block included in the concatenated data using the device-record-key, generates encrypted data, and overwrites a processing block with the generated encrypted data, the processing block being stored on the content storage unit 104 and having the same block number as the block number included in the concatenated data correlated with the received CID.

For example, if concatenated data consisting of CID "1," block number "2," and processing block "C2(2)" is received from the decryption unit 112, the encryption unit 103 runs the encryption algorithm E1 on C2(2) using the device-record-key in order to generate an encrypted block EC(2), and overwrites the CID "1" and block number "2" position on the content storage unit 104 with EC(2).

As a result, the disabled data at the CID "1" and block number "2" position in the content storage unit 104 is replaced with data in its form before being disabled.

The content storage unit 104 is constituted from a hard disk unit and correlates the CID written by the encryption unit 103 and the encrypted content that consists of groups of encrypted blocks, and stores the CID and the encrypted content.

Figure 4:
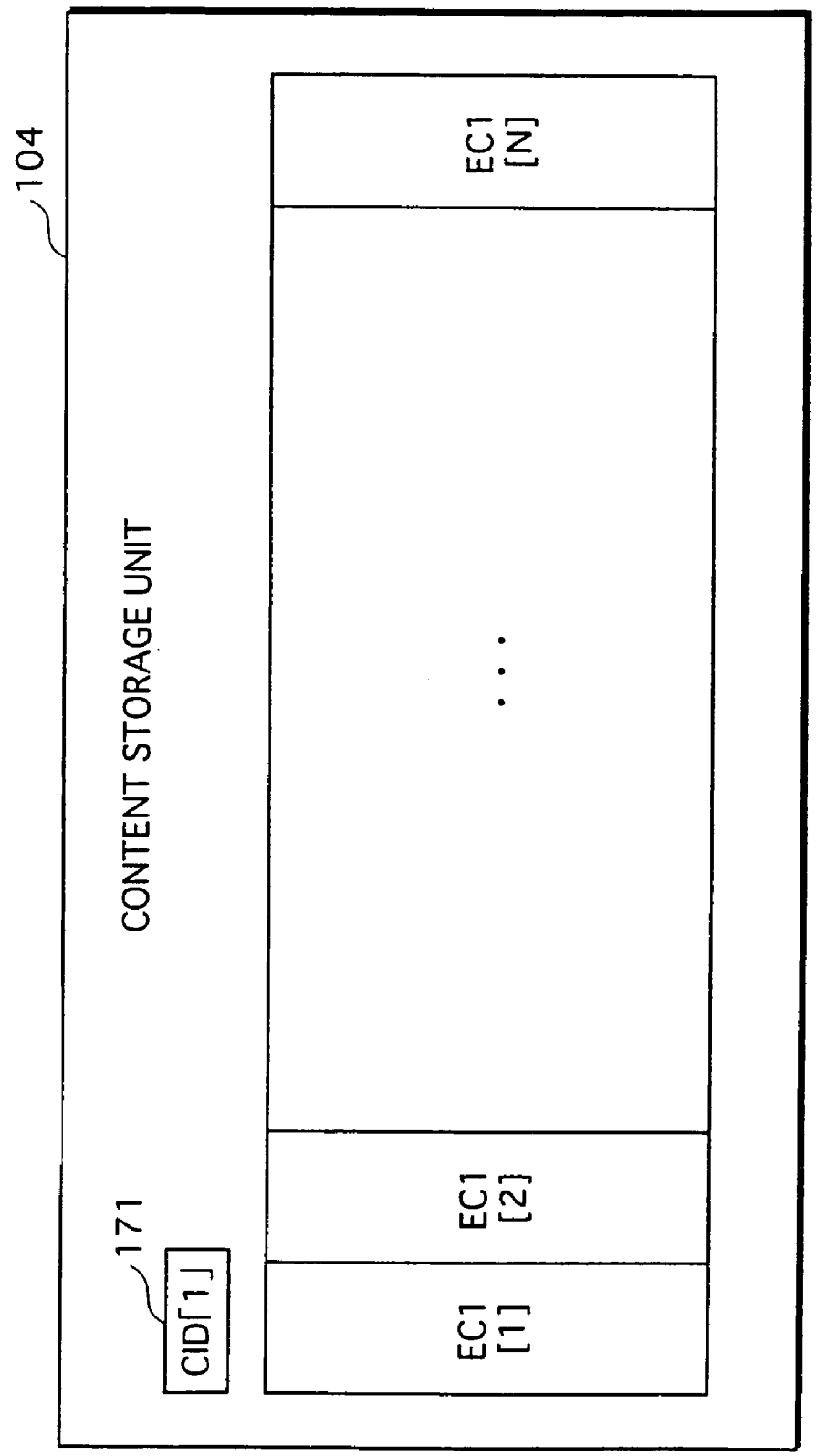
FIG. 4 shows exemplary data stored in a content storage unit.

The content storage unit 104 correlates a CID 171 having the value "1" with the encrypted content composed of an N number of encrypted blocks from EC1(1) to EC1(N), and stores them, for example, as shown in FIG. 4.

The encrypted content read unit 105 receives a read instruction including the CID from the control unit 113, reads, one by one and in order beginning with the lowest block number, the encrypted blocks which are stored on the content storage unit 104 and are correlated with the CID included in the read instruction, and transmits them to the decryption unit 106.

The decryption unit 106 reads the device-record-key from the device-record-key storage unit 101 when the HDD recorder is powered on. As encrypted blocks are received one by one from the encrypted content read unit 105, the decryption unit 106 runs a decryption algorithm D1 on the received encrypted blocks using the device-record-key in order to generate decrypted processing blocks, and outputs the generated processing blocks to the conversion unit 107, the partial information extraction unit 110, and the playback control unit 114.

For example, if EC1(1) is received from the encrypted content read unit 105, the decryption unit 106 runs the decryption algorithm D1 on EC1(1) using the device-record-key, generates C1(1), and outputs C1(1) to the conversion unit 107 and the partial information extraction unit 110.

Here, the decryption algorithm D1 is an algorithm for decrypting encrypted data generated by the encryption algorithm E1.

The conversion unit 107 converts the content, which is composed of processing blocks received from the decryption unit 106 and is encoded to the MPEG2 specification, to content encoded to the MPEG4 specification (hereafter, converted content), and transmits the converted content to the encryption unit 109.

For example, the conversion unit 107 receives processing blocks C1(1), C1(2), C1(3) . . . C1(N) in order from the decryption unit 106, and judges whether the received processing blocks can be transcoded to the MPEG4 specification. The conversion unit 107 determines, for example, whether pictures such as I-pictures are decodable based on the MPEG2 specification, and judges the pictures to be transcodable if they are decodable. MPEG4-specification converted blocks C2(1), C2(2) . . . C2(F) (F being a natural number) are generated by collectively transcoding the processing blocks which constitute the pictures to MPEG4.

The medium-record-key generation unit 108 receives, from the control unit 113, a first generate instruction which shows an instruction to generate a medium-record-key for the converted content and includes the device identifier and the CID. The unit 108 generates a medium-record-key KT4 using a pseudo-random number and transmits this key to the encryption unit 109. The unit 108 also writes the KT4 to a medium-record-key storage unit 303 of the SD card 300 which is described hereinafter, and erases the KT4 remaining in the medium-record-key generation unit 108.

Also, the medium-record-key generation unit 108 receives, from the control unit 113, a second generate instruction which shows an instruction to generate a medium-record-key for partial information and includes the device identifier and the CID. The unit 108 generates a medium-record-key KT2 using a pseudo-random number, and transmits this key to the encryption unit 111. The unit 108 also writes the KT2 to the medium-record-key storage unit 303 of the SD card 300 which is described hereinafter, and erases the KT2 remaining in the unit 108.

The encryption unit 109 receives the device identifier, the CID, and the KT4 from the medium-record-key generation unit 108. When the converted content is received from the conversion unit 107, the encryption unit 109 runs an encryption algorithm E2 on each converted block, being data of a given length, in the converted content using the KT4 in order to generate encrypted converted blocks. The encryption unit 109 then correlates the encrypted converted blocks with the device identifier and the CID, and writes the encrypted converted blocks, the device identifier, and the CID to a converted content storage unit 302 in the SD card 300 which is described hereinafter.

The partial information extraction unit 110 extracts, from among the processing blocks received sequentially from the decryption unit 106, a processing block which includes data of the first 512 bytes of an I-picture using a packet ID of the TSP in the processing block and a PCT flag whose value is "1" that is included in a head portion of the I-picture.

Figure 5:
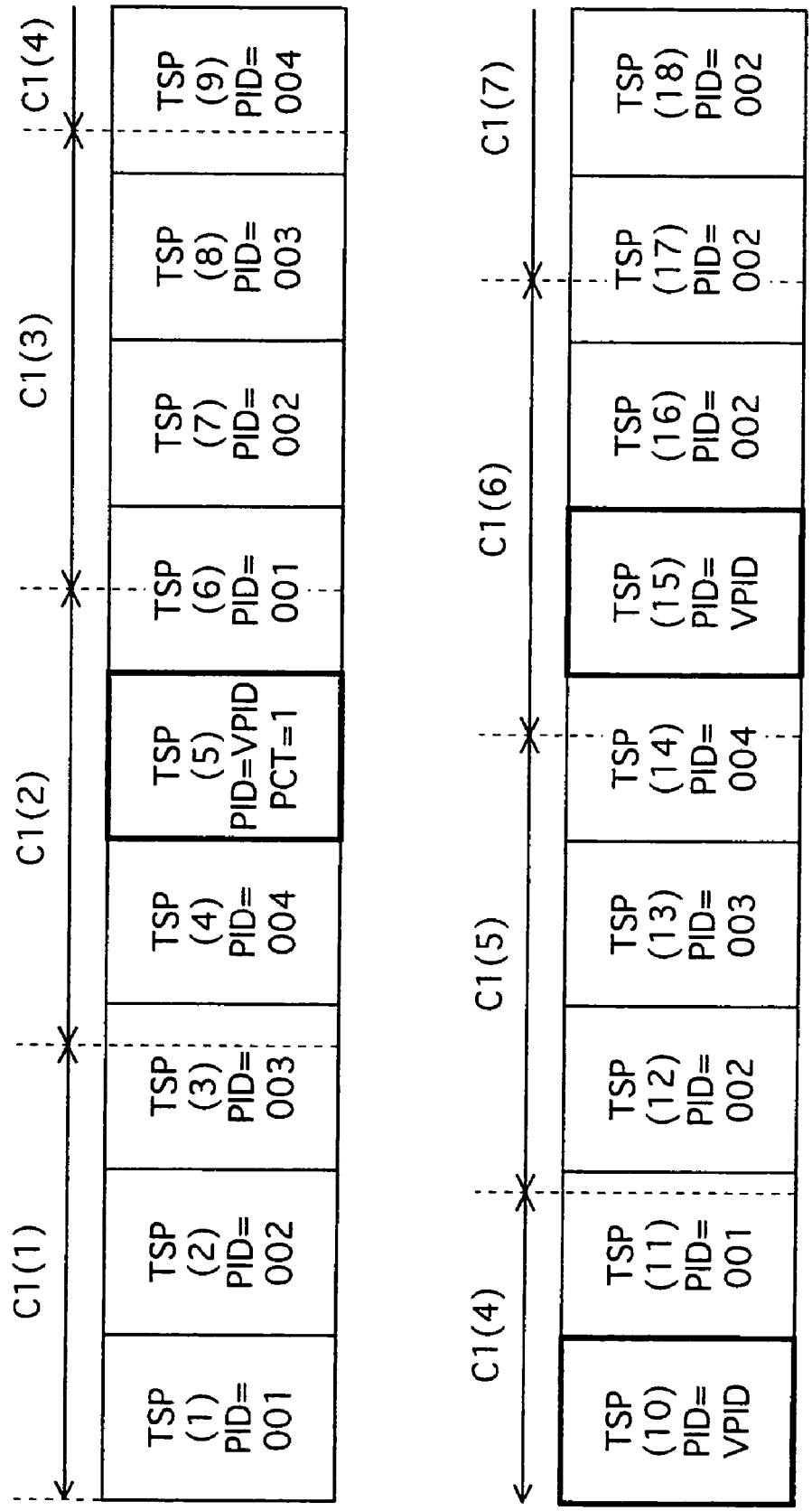
FIG. 5 shows an exemplary structure of data on which extraction processing is performed.

The following describes an exemplary case in which processing blocks C1(1) to C1(7) are inputted in order to the partial information extraction unit 118, as shown in FIG. 5.

Here, it is supposed that the partial information extraction unit 110 has received the CID and the VPID from the control unit 113, and a packet ID (hereafter, PID) of a TSP, which is encoded video data, is the value "VPID."

First, the partial information extraction unit 110 judges whether an inputted processing block includes a TSP in which PID=VPID. If judged in the negative, the processing block is discarded, and if judged in the affirmative, the unit 110 further judges whether the TSP includes a PCT with a value of "1."

If the processing block includes a TSP in which PID=VPID and the PCT is "1," the encrypted block shown by the block number of the processing block is overwritten with disabled data, and the byte count of the TSP included in the processing block is stored as a disabled byte count.

In the case of FIG. 5, EC1(2), which is an encrypted block stored on the content storage unit 104 and has the same block number as the processing block with block number "2" which is included in TSP(5), is overwritten with disabled data since C1(2) includes TSP(5) in which PID=VPID and the PCT is "1".

At this time, since TSP(5) in processing block C1(2) includes 188 bytes, the disabled byte count is set to be 188 bytes.

Next, the partial information extraction unit 110 judges whether an inputted processing block includes a TSP in which PID=VPID.

If it is judged that a TSP in which PID=VPID is not included, the processing block is discarded. If it is judged to be included, an encrypted block which is shown by a block number of the processing block and is stored on the content storage unit 104 is overwritten with disabled data, and a byte count of the TSP included in the processing block is stored as a disabled byte count.

Also, the block number of the processing block and the processing block itself are concatenated, and the partial block resulting from the concatenation is transmitted to the encryption unit 111.

Here, a partial block of processing block C1(L), whose block number is L, is referred to as PC1(L) (L being a natural number), and PC1(L) is shown as (L||C1(L)). The character "||" shows concatenation.

For example, if the applicable processing block is C1(2), the partial block PC1(2) is (2||C1(2)).

A processing block which includes a TSP in which PID=VPID as above would correspond to C1(4) and C1(6).

The partial information extraction unit 110 overwrites the encrypted block EC1(4) with disabled data, EC1(4) being stored on the content storage unit 104 and having the same block number as C1(4) whose block number is "4," and adds 188 bytes, being a byte count of TSP(10) which is included in C1(4), to the disabled byte count.

Also, the partial information extraction unit 110 transmits PC1(4)=(4||C1(4)) to the encryption unit 111.

Similarly, the partial information extraction unit 110 overwrites the encrypted block EC1(6) with disabled data, EC1(6) being stored on the content storage unit 104 and having the same block number as C1(6) whose block number is "6," and adds 188 bytes, being a byte count of TSP(10) which is included in C1(6), to the disabled byte count.

Also, the partial information extraction unit 110 transmits PC1(6)=(6||C1(6)) to the encryption unit 111.

Given that the disabled byte count, which is 564, exceeds 512 bytes, the partial information extraction unit 110 clears the disabled byte count to 0 bytes and returns to processing which judges whether the aforementioned processing block includes a TSP in which PID=VPID and the PCT is "1".

As a result of the above processing, it is possible to select a processing block which includes the first 512 bytes or more of video data corresponding to an I-picture, and to disable it.

The encryption unit 111 receives the device identifier, the CID, and the KT2 from the medium-record-key generation unit 108. When a partial block is received from the partial information extraction unit 110, the encryption unit 111 runs an encryption algorithm E3 on the received partial block using the KT2 in order to generate an encrypted partial block, correlates the encrypted partial block with the device identifier and the CID, and writes the encrypted partial block, the device identifier, and the CID to the partial information storage unit 304 in the SD card 300 which is described hereinafter.

The encrypted partial block resulting from the encryption of partial block PC1(L) is herebelow referred to as EPC1(L).

The decryption unit 112 can receive, from the control unit 113, a partial information read instruction including the CID and the device identifier. When the partial information read instruction is received, the decryption unit 112 reads the KT2 correlated with the CID and the device identifier included in the partial information read instruction, and which is stored in the medium-record-key storage unit 303 in the SD card 300 which is described hereinafter. The decryption unit 112 also reads, one by one and in order from the lowest block number, the encrypted partial blocks which are correlated with the CID and the device identifier included in the partial information read instruction, and which are stored in the medium-record-key storage unit 303 in the SD card 300 which is described hereinafter. The decryption unit 112 runs a decryption algorithm D3 on the read encrypted partial blocks using the KT2, restores the partial blocks which are a conjoining of the block numbers and processing blocks, and transmits the restored partial blocks to the encryption unit 103.

Here, the decryption algorithm D3 is an algorithm for decrypting data encrypted by the encryption algorithm E3.

For example, if the decryption unit 112 reads encrypted partial block EPC1(L) from the partial information storage unit 304, the unit 112 runs the decryption algorithm D3 on EPC1(L) using the KT2 in order to generate PC1(L)=(L||C1 (L)), and transmits PC1(L) to the encryption unit 103.

The control unit 113 controls all operations of the HD recorder 100.

The control unit 113 reads the device-record-key and the device identifier from the device-record-key storage unit 101 when the device is powered on, and holds them.

The control unit 113 receives operation instruction information from the operation instruction acquisition unit 117 and performs processing corresponding with the received operation instruction information.

If operation instruction information indicating a content move and including the CID of the content to be moved is received from the operation instruction acquisition unit 117, the control unit 113 transmits an authentication instruction to the authentication unit 115. If mutual authentication processing by the authentication unit 115 is successful, the control unit 113 further transmits a read instruction including the CID to the encrypted content read unit 105; transmits to the medium-record-key generation unit 108 a first generate instruction which shows an instruction to generate a medium-record-key for the converted content and includes the device identifier "ID_A" and the CID, and a second generate instruction which shows an instruction to generate a medium-record-key for the partial information and includes the device identifier "ID_A" and the CID; and notifies the partial information extraction unit 110 of the VPIDs.

If the VPIDs are received from the content reception unit 102, the control unit 113 also stores them in the content storage unit 104.

If operation instruction information which indicates playback of the content and includes the CID of the content to be played back is received from the operation instruction acquisition unit 117, the control unit 113 transmits a read instruction including the CID to the encrypted content read unit 105, and transmits an instruction to the playback control unit 114 to play back the content.

If operation instruction information which indicates a move-back and includes the CID of the content to be moved back is received from the operation instruction acquisition unit 117, the control unit 113 transmits an authentication instruction to the authentication unit 115.

The control unit 117 receives a result of the authentication processing from the authentication unit 115. If the authentication processing was successful, the control unit 117 transmits a device-record-key read instruction to the encryption unit 103, erases the KT4 which is correlated with the device identifier "ID_A" and the CID and is stored in the medium-record-key storage unit 303, erases the converted content which is correlated with the device identifier "ID_A" and the CID and is stored in the converted content storage unit 302, and transmits a partial information read instruction including the device identifier "ID_A" and the CID to the decryption unit 112.

If the authentication processing fails, the control unit 113 ends processing.

The playback control unit 114 is composed of an MPEG decode circuit and a DA (Digital to Analog) converter, and receives a TS from the content reception unit 102 and the decryption unit 106 in TSP units.

The MPEG decode circuit decodes, based on the MPEG2 specification, the received TS to digital signals which show the pre-compression video and audio, converts, using the DA converter, the decoded digital signals to analog signals which show the video and audio, and outputs the analog signals to the monitor 120.

Since MPEG2 is a known technique, its description has been omitted.

The authentication unit 115 receives an authentication instruction from the control unit 113 to authenticate the SD card 300, performs mutual authentication processing with the SD card 300, and transmits a result of the authentication processing to the control unit 113.

If the mutual authentication processing with the SD card 300 is successful, the SD card is thereafter permitted to write data to the HD recorder 100.

The authentication unit 115 performs the mutual authentication processing based on the CPRM (Content Protection for Recordable Media) specification, for example.

CPRM is a known technique and is not particularly described herein.

The write/read unit 116 performs reading and writing of information to the SD card 300.

The operation instruction acquisition unit 117 includes a reception circuit for a remote controller and various buttons such as a power button, a record button, a move button, a reception-channel set button, a menu button, a select button, a cursor-move button, and a content ID select button.

The operation instruction acquisition unit 117 receives button and remote controller operations from the user, and outputs operation instruction information indicating the received operations to the control unit 113.

The monitor 120 is a TV receiver with a built-in display and speakers. The monitor 120 receives video signals from the playback control unit 114, displays the video on the display based on horizontal synchronization signals and vertical synchronization signals, receives audio signals from the playback control unit 114, and converts the received audio signals to audio which is outputted to the speakers.

Structure of the SD Card 300

As shown in FIG. 2, the SD card 300 is constituted from an authentication unit 301, a converted content storage unit 302, a medium-record-key storage unit 303, and a partial information storage unit 304.

Here, a storage area in the SD card 300 is constituted from a secure storage area and non-secure storage areas. Specifically, the medium-record-key storage unit 303 is the secure storage area, and the converted content storage unit 302 and the partial information storage unit 304 are the non-secure storage areas.

The SD card 300 is specifically a computer system constituted from a microprocessor, ROM, RAM, etc., whereby the RAM stores a computer program. The SD card 300 achieves its functions as the microprocessor operates in accordance with the computer program.

The authentication unit 301 performs mutual authentication processing with the authentication unit 115 in the HD recorder 100 in accordance with a request from the authentication unit 115.

If the mutual authentication processing is successful, the authentication unit 301 thereafter permits the HD recorder 100 to read and write data to the secure medium-record-key storage unit 303.

The converted content storage unit 302 stores the converted content written by the encryption unit 109.

Figure 6:
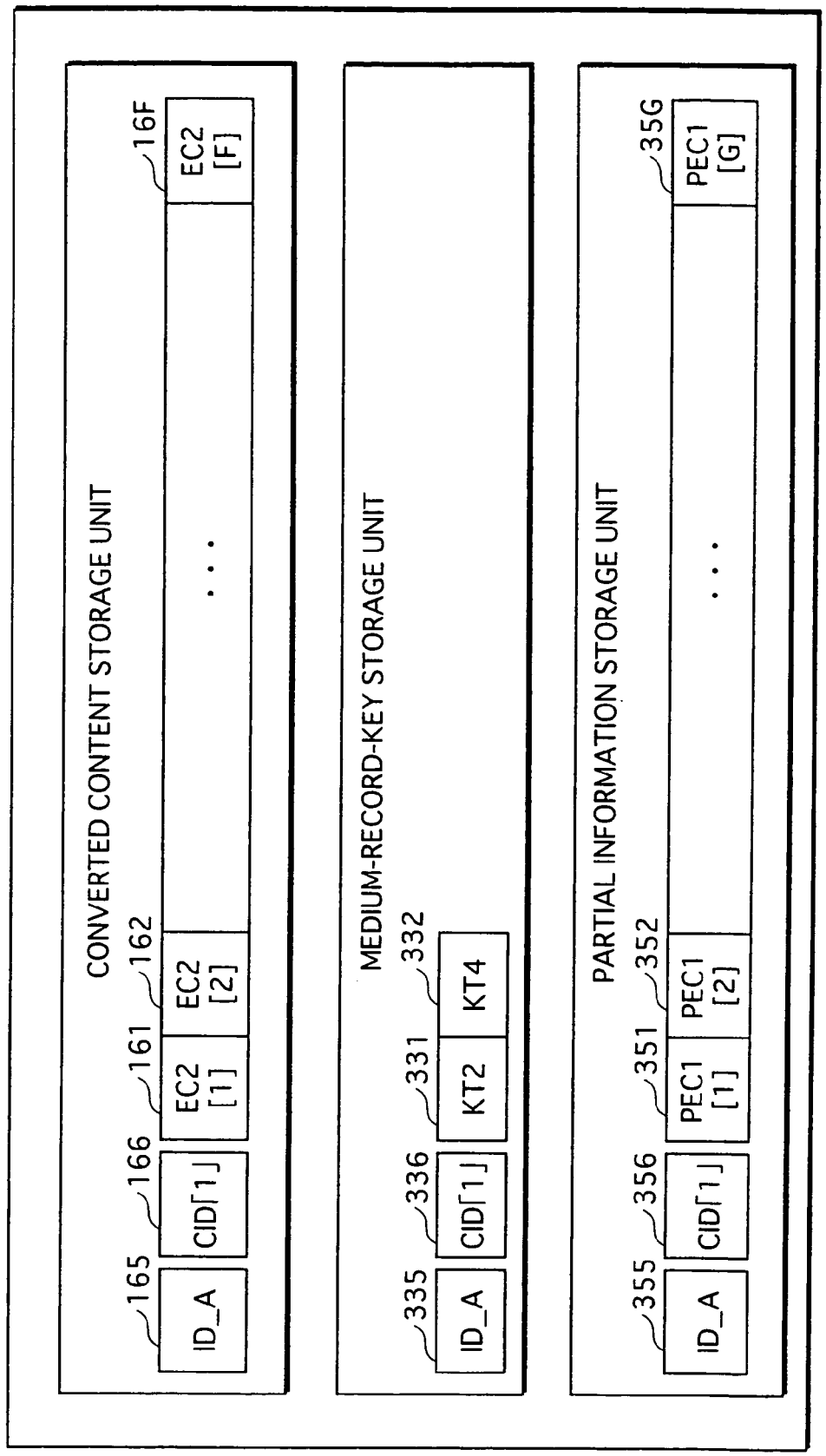
FIG. 6 shows an example of data stored on an SD card.

For example, the converted content storage unit 302 correlates a device identifier ID_A (165) and a CID 166 with an F number of encrypted converted blocks EC2(1) to EC2(F), and stores the device identifier, the CID, and the encrypted converted blocks as shown in FIG. 6.

The medium-record-key storage unit 303 correlates a device identifier ID_A (335) and a CID 336 with a medium-record-key KT2 (331) and a KT4 (332), as shown in FIG. 6, which were written by the medium-record-key generation unit 108, and stores the device identifier, the CID, and the medium-record-keys.

The partial information storage unit 304 correlates, for example, the device identifier ID_A (335) and the CID 356 with a G number (G being a natural number) of encrypted converted blocks PEC1(1) to PEC1(G), and stores them as shown in FIG. 6.

Operations

Operations of the content record/playback system 1 are described in the order of (1) move processing of content from the HD recorder 100 to the SD card 300 and (2) move-back processing of moved content from the SD card 300 to the HD recorder 100.

(1) Move Processing

Figure 7:
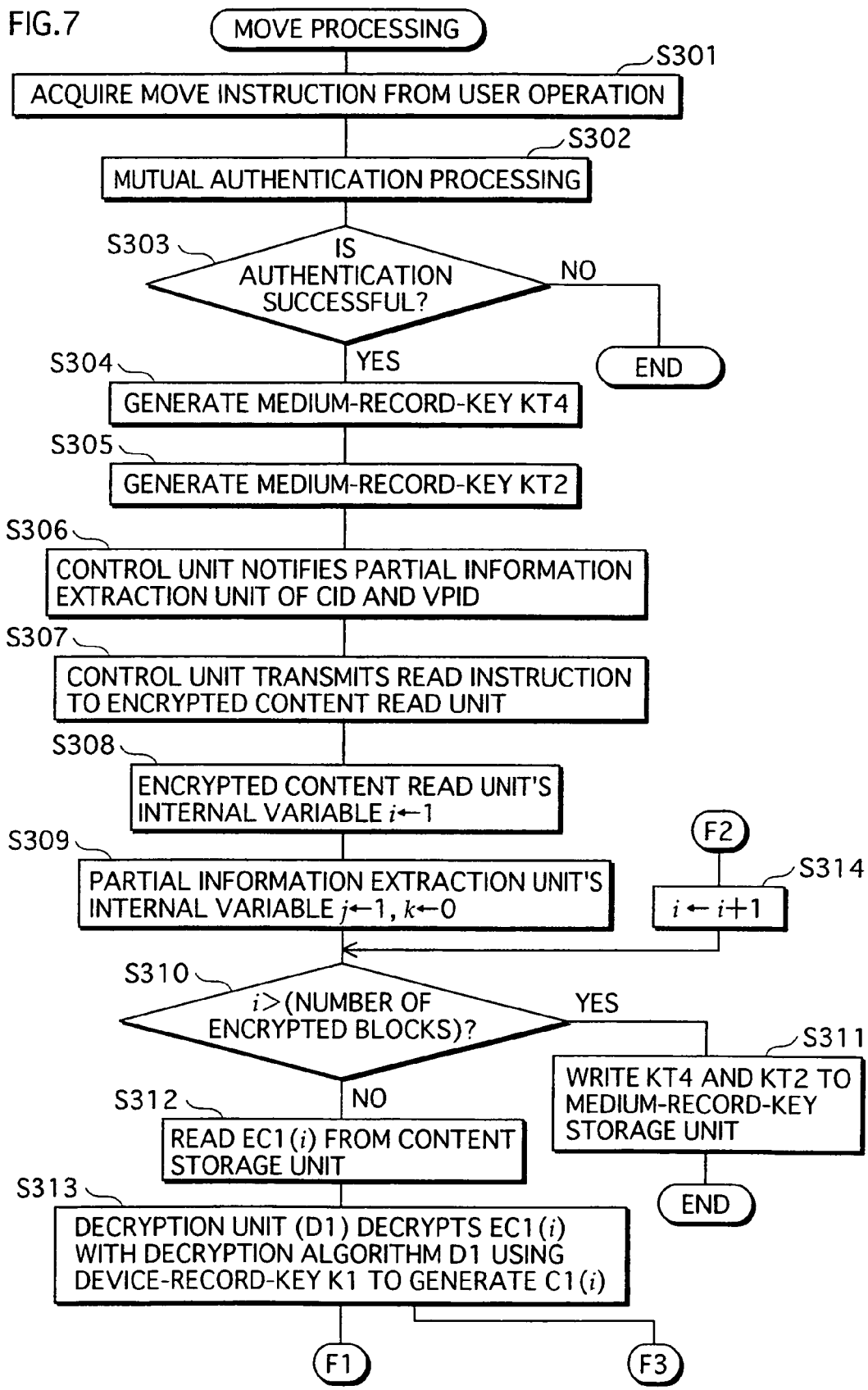
FIG. 7 is a flowchart showing move processing of the content.
Figure 8:
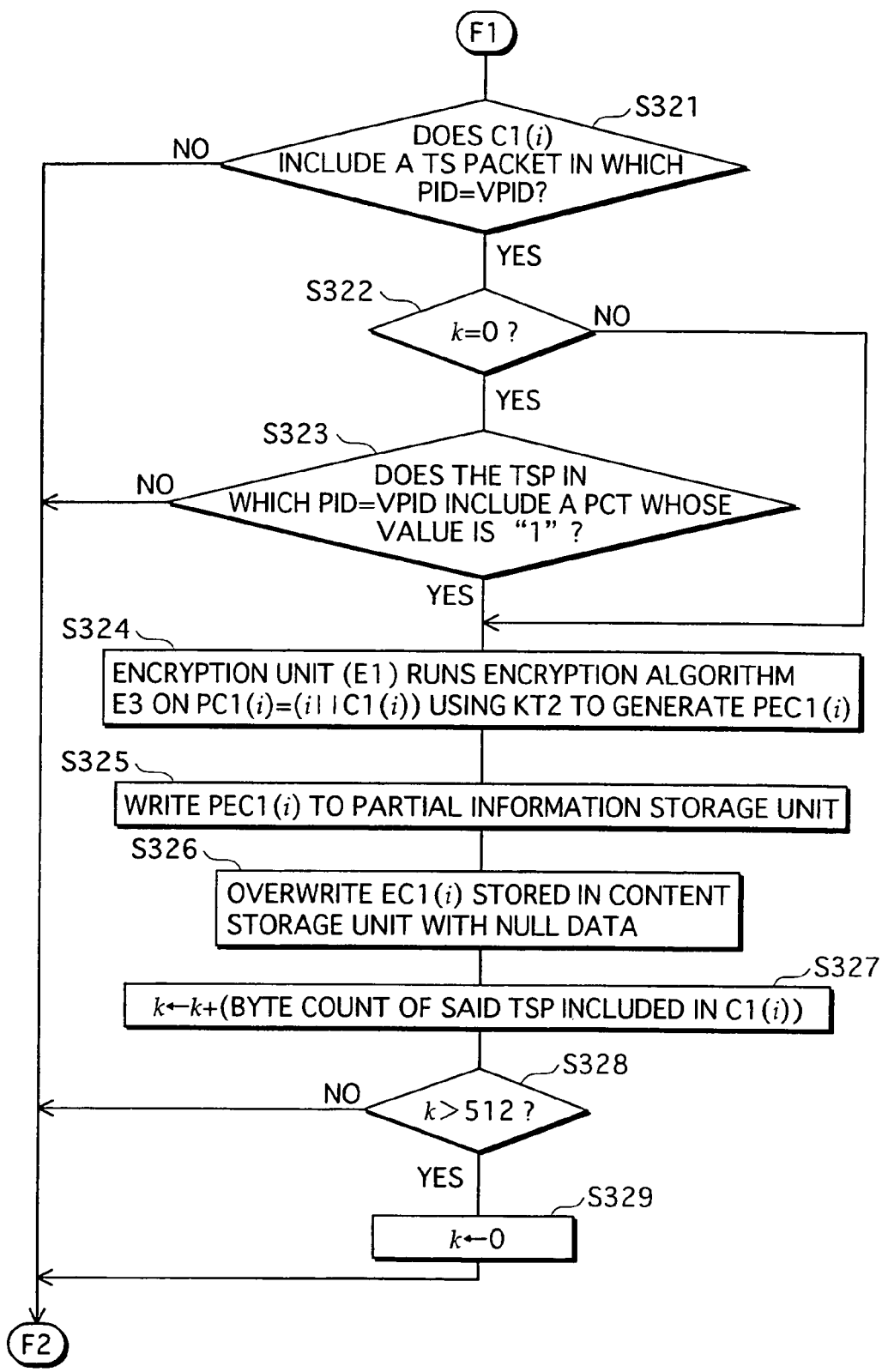
FIG. 8 is a flowchart showing move processing of the content.
Figure 9:
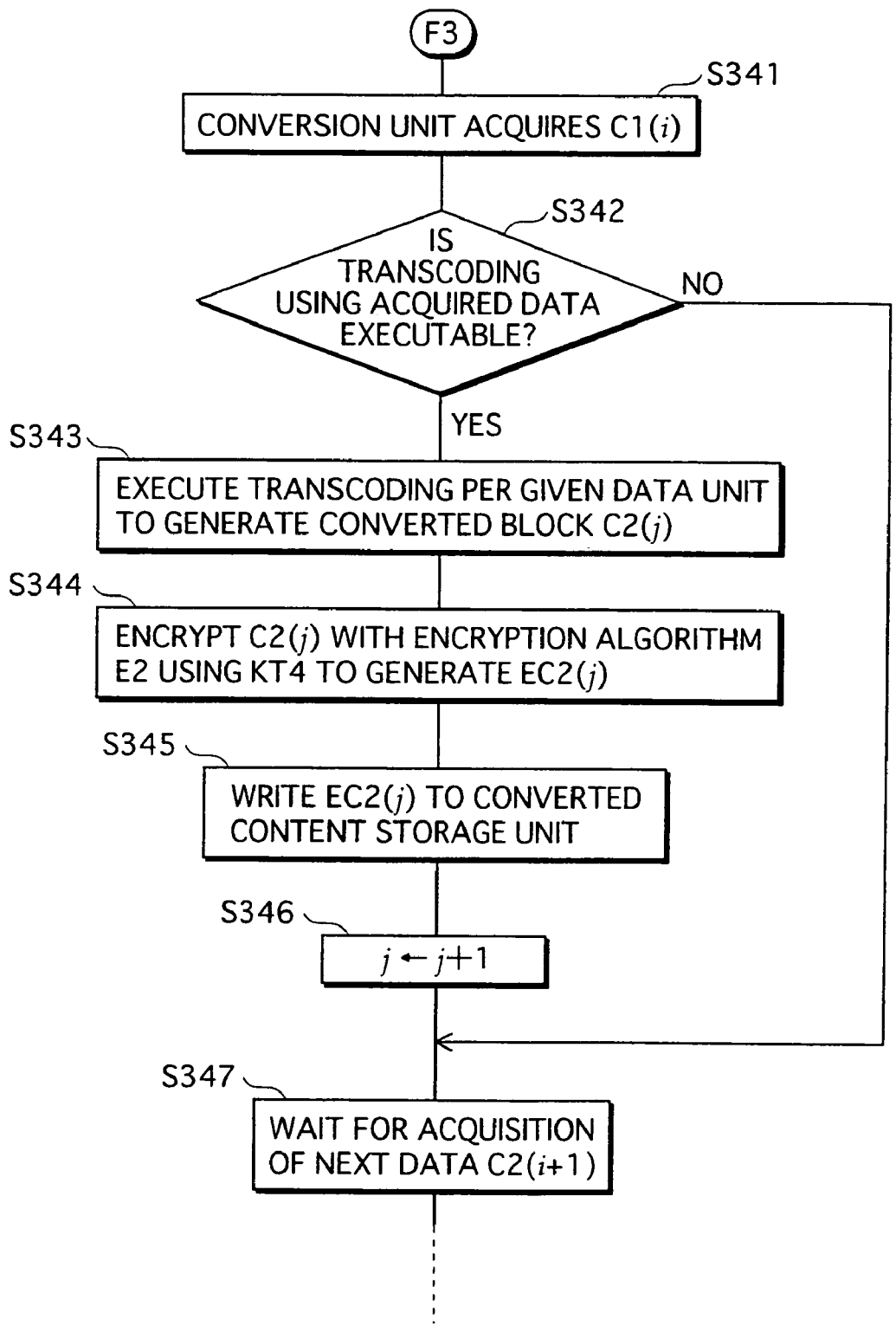
FIG. 9 is a flowchart showing move processing of the content.

Processing which moves content stored in the aforementioned content storage unit 104 to the SD card 300 is described using FIGS. 7 to 9.

Here, a CID "1" (171) and EC1(1) to EC1(N) are correlated and stored as encrypted content as shown in FIG. 4 on the content storage unit 104, and data is assumed to not be stored in the converted content storage unit 302, the medium-record-key storage unit 303, and the partial information storage unit 304 of the SD card 300.

The user instructs a move of the content by operating the remote controller.

The operation instruction acquisition unit 117 transmits to the control unit 113 operation instruction information which indicates a move instruction and includes a CID of the content to be moved (step S301).

The control unit 113 transmits to the authentication unit 115 an instruction to perform authentication with the SD card 300.

The authentication unit 115 performs mutual authentication processing with the authentication unit 301 of the SD card 300, and notifies the control unit 113 of the result of the authentication (step S302).

If the mutual authentication fails (step S303:NO), processing is ended.

If the mutual authentication is successful (step S303:YES), the control unit 113 transmits to the medium-record-key generation unit 108 a first generate instruction which includes the device identifier "ID_A" which was read in advance from the device-record-key storage unit 101 and the CID included in the operation instruction information. The medium-record-key generation unit 108 receives the first generate instruction, generates the medium-record-key KT4, and transmits the ID_A, the CID, and the KT4 to the encryption unit 109 (step S304).

The control unit 113 transmits a second generate instruction including the ID_A and the CID to the medium-record-key generation unit 108 which receives the second generate instruction, generates the medium-record-key KT2, and transmits the ID_A, the CID, and the KT2 to the encryption unit 111 (step S305).

The control unit 113 notifies the partial information extraction unit 110 of the CID and the VPID (step S306).

The control unit 113 transmits a read instruction to the encrypted content read unit (step S307).

The encrypted content read unit 105 receives the read instruction from the control unit 113, and resets an internal variable i to "1" (step S308).

The partial information extraction unit 110 receives the VPID, resets an internal variable j to "1," and resets k to "0" (step S309).

The encrypted content read unit 105 judges whether the internal variable i is greater than a number of encrypted blocks stored on the content storage unit 104 (step S310).

If i is greater than the number of encrypted blocks (step S310:YES), the encrypted content read unit 105 transmits a medium-record-key write instruction to the medium-record-key generation unit 108.

The medium-record-key generation unit 108 writes the ID_A, the CID, the KT4, and the KT2 to the medium-record-key storage unit 303 (step S311), deletes the KT4 and the KT2 remaining on the medium-record-key generation unit 108, and ends processing.

If i is less than the number of encrypted blocks (step S310: NO), the encrypted content read unit 105 reads $EC1(i)$ from the content storage unit 104, and transmits the read $EC1(i)$ to the decryption unit 106 (step S312).

The decryption unit 106 runs the decryption algorithm D1 on $EC1(i)$ using the device-record-key K1 in order to generate $C1(i)$, and transmits the generated $C1(i)$ to the partial information extraction unit 110 and the conversion unit 107 (step S313).

The partial information extraction unit 110 receives $C1(i)$, and judges whether the received $C1(i)$ includes a TSP in which PID=VPID (step S321).

If $C1(i)$ does not include a TSP in which PID=VPID (step S321: NO), i is incremented one value (step S314), and processing moves to step S310.

If $C1(i)$ includes a TSP in which PID=VPID (step S321: YES), the partial information extraction unit 110 judges whether k is "0" (step S322).

If k is not "0" (step S322:NO), processing moves to step S324 which is described hereinafter.

If k is "0" (step S322:YES), the partial information extraction unit 110 judges whether the TSP in which PID=VIP includes a PCT whose value is "1" (step S323).

If a PCT whose value is "1" is not included (step S323: NO), processing moves to step S314.

If a PCT whose value is "1" is included (step S323:YES), the partial information extraction unit 110 transmits $PC1(i)=(i\|C1(i))$ to the encryption unit 111.

The encryption unit 111 runs the encryption algorithm E3 on $PC1(i)$ using the KT2 in order to generate $PEC1(i)$ (step S324).

The encryption unit 111 writes $PEC1(i)$ to the partial information storage unit 304 (step S325).

If the ID_A and the CID are not written on the partial information storage unit 304, however, the ID_A and the CID are correlated with the $PEC1(i)$ and written to the unit 304.

The partial information extraction unit 110 overwrites EC1 (i), which corresponds to the CID and is stored on the content storage unit 104, with null data (step S326).

The partial information extraction unit 110 adds a byte count of the TSP in which PID=VPID and which is included in $C1(i)$ to k (step S327).

The partial information extraction unit 110 judges whether k is greater than 512 (step S328).

If k is greater than 512 (step S328:YES), k is reset to "0" (step S329), and processing moves to step S314.

If k is less than 512 (step S328:NO), processing moves directly to step S314.

Also, in step S313, the conversion unit 107 receives $C1(i)$ which was transmitted from the decryption unit 106 (step S341), and judges whether transcoding is possible based on data which has been received from the decryption unit 106 so far and is being stored (step S342).

If transcoding is not possible (step S342:NO), the conversion unit 107 waits to receive the next data from the decryption unit 106 (step S347).

If transcoding is possible (step S342:YES), the conversion unit 107 executes transcoding per given data unit, resulting in the generation of converted block $C2(j)$ (step S343), and transmits $C2(j)$ to the encryption unit 109.

The encryption unit 109 receives $C2(j)$, runs the encryption algorithm E2 on $C2(j)$ using the KT4, and generates $EC2(j)$ (step S344).

The encryption unit 109 correlates $EC2(j)$ with the ID_A and the CID, and writes $EC2(j)$ to the converted content storage unit 302 (step S345).

However, if the ID_A and the CID are not written on the converted content storage unit 302, the encryption unit 109 correlates the ID_A, the CID, and $EC2(j)$, and writes $EC2(j)$ to the converted content storage unit 302.

The conversion unit 107 increments j one value (step S346), and processing moves to step S347.

As a result of the above processing and as shown in FIG. 6, the ID_A 165, the CID 166, and the F number (F being a natural number) of converted blocks $EC2(1)$ to $EC2(F)$ are correlated and stored in the converted content storage unit 302 of the SD card 300; the ID_A 335, the CID 336, the KT2 (331), and the KT4 (332) are correlated and stored in the medium-record-key storage unit 303; and the ID_A 355, the CID 356, and the G number (G being a natural number) of encrypted partial blocks $PEC1(1)$ to $PEC1(G)$ are correlated and stored in the partial information storage unit 304.

The ID_A 165, the ID_A 335, and the ID_A 355 are device identifiers carrying the same value, while the CID 166, the CID 336, and the CID 356 are pieces of content identification information carrying the same value.

(2) Move-Back Processing

Figure 10:
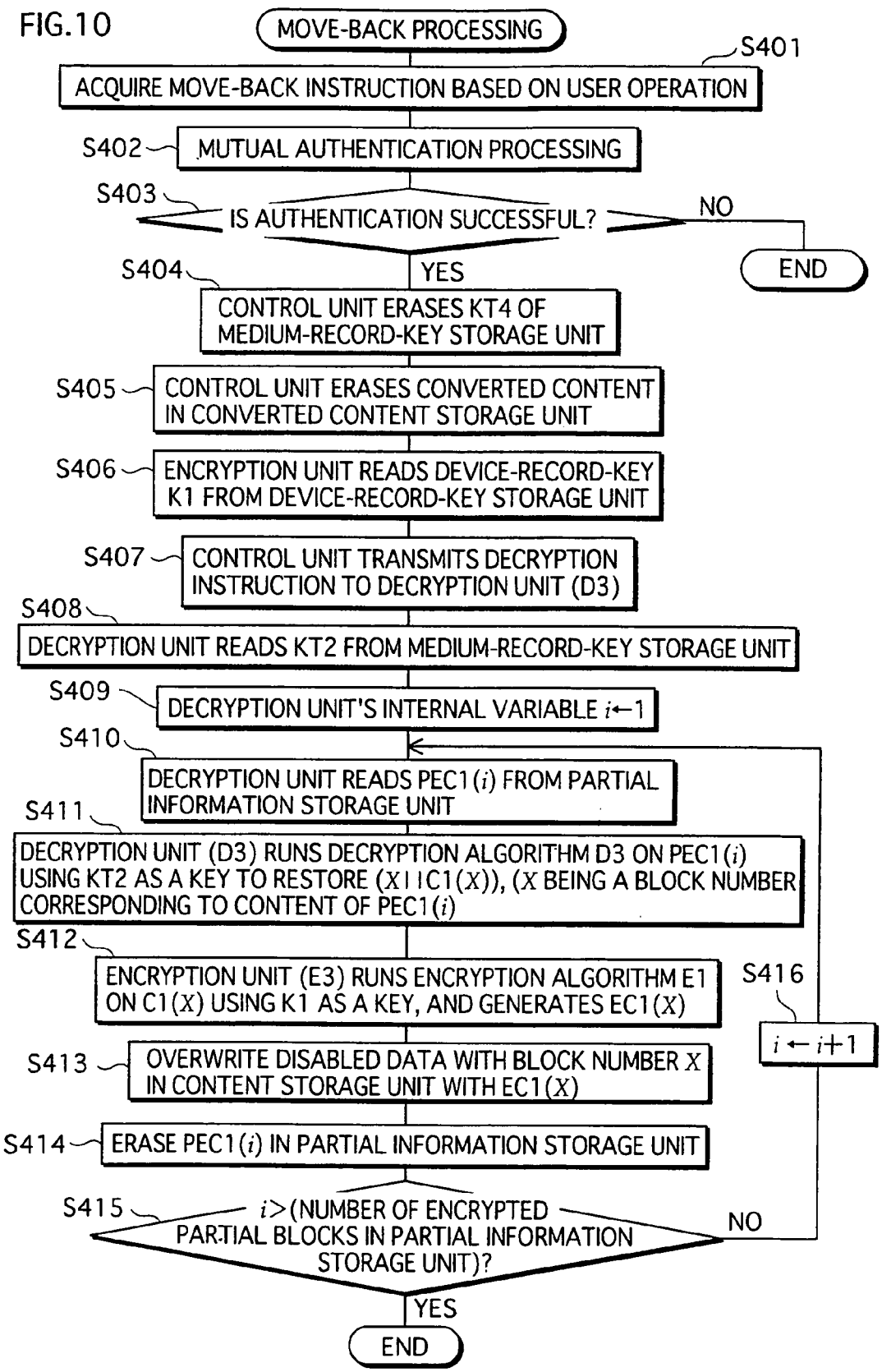
FIG. 10 is a flowchart showing move-back processing of the content.

A process that moves content, which was moved from the HD recorder 100 to the SD card 300 as a result of the aforementioned (1) move processing, back from the SD card 300 to the HD recorder 100 is described below using FIG. 10.

A user operates a remote controller to instruct a move-back of moved content.

The operation instruction acquisition unit 117 transmits to the control unit 113 operation instruction information which indicates a move-back instruction and includes a CID of the content to be moved back (step S401).

The control unit 113 receives from the operation instruction acquisition unit 117 the operation instruction information which indicates the move-back instruction and transmits an authentication instruction to the authentication unit 115.

The authentication unit 115 executes mutual authentication processing with the authentication unit 301 (step S402).

If the mutual authentication processing fails (step S403: NO), the control unit 113 ends processing.

If the mutual authentication processing is successful (step S403:YES), the control unit 113 transmits a device-record-key read instruction to the encryption unit 103 and erases the KT4 which corresponds to the CID and the ID_A and is stored in the medium-record-key storage unit 303 (step S404).

The control unit 113 erases the converted content which corresponds to the CID and the ID_A and is stored in the converted content storage unit 302 (step S405).

When the encryption unit 103 receives the device-record-key read instruction, it reads the device-record-key K1 from the device-record-key storage unit 101 (step S406).

The control unit 113 transmits a partial information read instruction which includes the ID_A and the CID to the decryption unit 112 (step S407).

The decryption unit 112 reads the KT2 which corresponds to the ID_A and the CID from the medium-record-key storage unit 303 (step S408).

The decryption unit 112 resets the internal variable to "1" (step S409).

The decryption unit 112 reads PEC1($i$) which corresponds to the ID_A and the CID from the partial information storage unit 304 (step S410).

The decryption unit 112 runs the decryption algorithm D3 on PEC1($i$) using the KT2 as a key in order to restore PC1(X)=(X||C2(X)), and transmits the CID and PC (X) to the encryption unit 103 (step S411).

The encryption unit 103 receives PC (X), retrieves C2(X) from PC1(X), and runs the encryption algorithm E1 on C1(X) using the K1 as a key in order to generate EC1(X) (step S412).

The encryption unit 103 overwrites the disabled data in the content storage unit 104, whose block number is X, and which corresponds to the CID, with EC1(X) (step S413).

The control unit 113 erases PEC(i) which corresponds to the ID_A and the CID from the partial information storage unit 304 (step S414).

The decryption unit 112 judges whether i is greater (than a number of encrypted blocks in the partial information storage unit) (step S415).

If i is judged to be greater (than the number of encrypted blocks in the partial information storage unit) (step S415: YES), the move-backprocessing ends. If i is less than (the number of encrypted blocks in the partial information storage unit) (step S415:NO), i is incremented one value (step S416), and processing moves to step S410.

Also, when the move-back processing ends, the control unit 113 erases the ID_A 165 and the CID 166 which are stored in the converted content storage unit 302, erases the ID_A 335 and the CID 336 which are stored in the medium-record-key storage unit 303, and erases the ID_A 355 and the CID 356 which are stored in the partial information storage unit 304.

Other Variations

The present invention has been described based on the above embodiment, although it is certainly not limited to the above embodiment. Cases such as the following are included in the present invention.

(1) The present embodiment is structured so as the medium-record-key KT4 and the converted content stored on the SD card are erased if the content is moved back from the SD card to the HD recorder, although the present invention is not limited to such a structure.

For example, the present invention may put the converted content into an unusable state by erasing the KT4 necessary for decoding of the converted content without erasing the converted content itself. Also, the present invention may discard a portion of the converted content instead of erasing the entire converted content, thereby putting it into an unusable state.

(2) The HD recorder may further include a status storage unit operable to store thereon a state of progress of the move processing.

For example, if a move of a content to the SD card is not completed properly, the HD recorder may judge, based on the state of progress stored in the status storage unit, whether to continue the move processing of the content or redo the move processing of the content from the beginning.

Furthermore, the HD recorder may include a notification unit operable to notify the user of the state of progress stored in the status storage unit. In such a case, the notification unit may notify the user that the move processing was not completed properly, receive an instruction from the user to continue the move processing of the content or to redo the move processing of the content from the beginning, and execute the move processing based on the instruction.

(3) In the present embodiment, when a key is moved from the HD recorder to the SD card, the key remaining on the HD recorder is erased. The HD recorder may be structured so that after the SD card receives the key and records it in a recording area, the HD recorder which sent the key is notified that recording of the key was successful, whereby the HD recorder erases its remaining key after receiving the notification.

(4) In the present embodiment, an identifier is attached to content for uniquely identifying the content. When the content is moved from the HD recorder to the SD card, the identifier is recorded as well. The HD recorder may be structured so that when the content moved to the SD card is written back to its recording area, the HD recorder judges whether the identifier it has stored is with the same as the identifier of the content recorded on the SD card, and writes the content back only if the two identifiers are the same.

Also, an identifier which uniquely identifies the move-source device may be attached instead of an identifier which uniquely identifies the content. In such a case, the HD recorder may judge whether the identifier which uniquely identifies the move-source device and is attached to the content is with the same as its own device identifier, and writes the content back only if the two identifiers are the same.

(5) The embodiment of the present invention is structured so the HD recorder encrypts partial blocks using a medium-record-key and writes the encrypted blocks to the SD card, although the structure is not limited to such. The partial blocks may be encrypted using a device-record-key and recorded, or the partial blocks may be encrypted using a newly generated key and recorded.

(6) Encryption algorithms E1, E2, and E3, and decryption algorithms D1, D2, and D3 are not specifically defined in the present embodiment, although encryption and decryption processing may be performed in accordance with a commonly used encryption method such as DES (Data Encryption Standard), AES (Advanced Encryption Standard), etc.

Also, authentication processing and communication processing between the HD recorders and the SD card may be performed based on the commonly used CPRM standard or another standard capable of copyright protection.

Similarly, authentication processing and communication processing among multiple HD recorders may be performed based on the commonly used DTCP standard or another standard capable of copyright protection.

(7) The present embodiment is structured so content is provided from the content provision device to the HD recorder in a TS format, although the structure is not limited as such.

For example, the HD recorder may include a broadcast reception unit such as a tuner, whereby content is delivered from the content provision device over broadcast waves via a satellite. The HD recorder may receive the broadcast waves and restore the content from the received broadcast waves.

Also, the HD recorder may read content from a recording medium such as a DVD (Digital Versatile Disc) or BD (Blu-ray Disc) on which content is recorded.

(8) The HD recorder stores content encoded according to the MPEG2 specification, transcodes the content to content encoded to the MPEG4 specification, and writes the transcoded content according to the SD card, although the present invention is not limited as such.

For example, conversion of the content may not always need to be performed. The storage volume of the SD card may be large, and conversion of the content from MPEG2 to MPEG4 may not be performed if the content can be recorded as it is to the SD card. The HD recorder may calculate, before performing move processing, the size of the unused area of the SD card's storage volume and perform move processing after judging whether to execute conversion in accordance with a condition such as the remaining volume of the SD card's storage area. For example, the HD recorder would perform the conversion processing if the size of the unused area is smaller than the size of the content.

Also, the encoding method of the content before and after the move need not be limited to MPEG2 and MPEG4.

The compression rate of an encoding system of the content after the move need only be higher than an encoding system for encoding of the content before the move.

For example, the content may be encoded based on the MPEG4 specification and recorded on the HD recorder, while the content may be transcoded based on the MPEG7 specification and written to the SD card.

Also, the HD recorder may judge whether to trans code during move processing according to the image frame resolution of content based on the MPEG2 specification and stored on the HD recorder.

For example, if the image frame resolution is larger than VGA (Video Graphics Array), transcoding may be executed, while if the image frame resolution is smaller than VGA, the content may be moved from the HD recorder to the SD card without executing transcoding.

(9) An example of disabling the first 512 bytes of an I-picture was described, although the present invention is not limited as such.

The content stored in the content storage device need only be processed so that proper playback is not possible.

For example, several TSPs (for example, 3) in which PID=VPID and which include a TSP in which the PCT is "4" may be disabled.

Also, a given position of an I-picture or the entire I-picture may be disabled, rather than being limited to the first portion, and the disabled data may be scattered data rather than successive data.

Also, the disabled data is not limited to an I-picture. A P-picture may be combined and disabled, or data used for selecting a PAT, PMTs, etc., for example, may be disabled.

Also, a predetermined location in the content may be disabled, such as the first 64 bytes of a processing block or from the 449th byte to the 512th byte.

(10) In the present embodiment, the HD recorder concatenates a processing block and a block number which is a location thereof in the content to generate a partial block, and further encrypts the partial block to generate an encrypted partial block which is written to the SD card, although the present invention is not limited as such.

For example, the block number may be stored in the content storage unit, and the processing block corresponding to the block number may be encrypted and written to the SD card.

In such a case, the HD recorder may read the encrypted processing block from the SD card, decrypt the processing block, read the block number from the content storage unit, encrypt the processing block with a device key, and overwrite a portion corresponding with the position shown by the block number with the encrypted processing block.

(11) In the present embodiment, an example of moving content recorded on the HD recorder to the SD card is described, although the present invention is not limited as such. The HD recorder may include a high-volume recording medium other than a hard disk, such as a DVD (Digital Versatile Disc) recorder or a BD (Blu-ray Disk) recorder. The SD card may be a recording medium other than an SD card, such as an IC card, a hard disk, or a DVD disk.

(12) The present embodiment is structured so that content is moved from the HD recorder to the SD card, although the structure is not limited as such. Content may be moved from the HD recorder to another HD recorder or from a record/playback device to another record/playback device.

Figure 11:
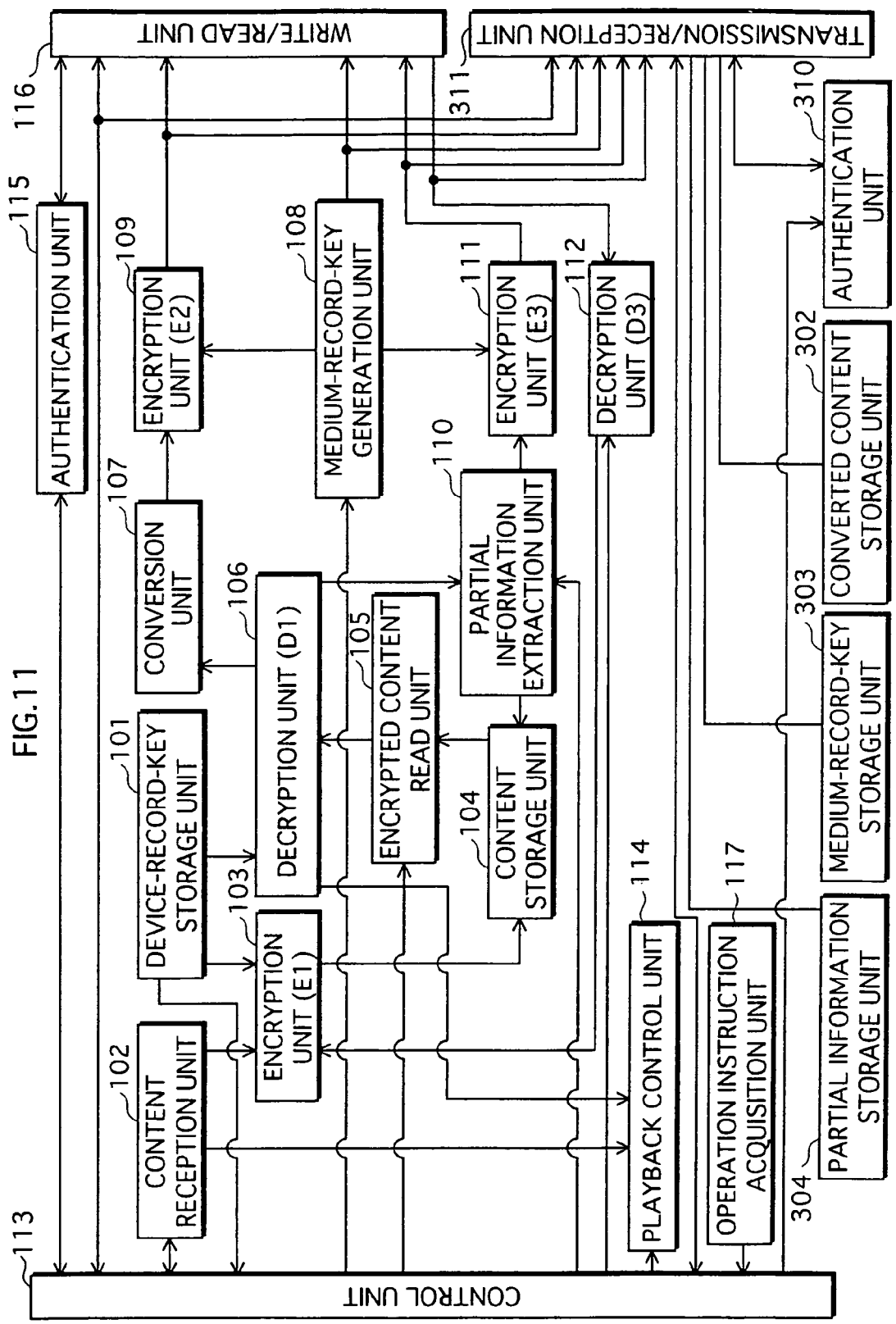
FIG. 11 is a block diagram showing an exemplary construction of an HD recorder which performs move processing between devices.

The HD recorder 400 shown in FIG. 11 is structured as the HD recorder 100 to which a transmission/reception unit 311 operable to perform communication with another HD recorder and an authentication unit operable to perform mutual authentication processing with another HD recorder have been added. The converted content storage unit 302, the medium-record-key storage unit 303, and the partial information storage unit 304 which were included in the SD card have been added as well.

The same processing as the move processing and move-back processing described using the HD recorder 100 and the SD card 300 of the aforementioned embodiment can be realized using the HD recorder 400 and an identically structured HD recorder 500.

When moving its content to the HD recorder 500, the HD recorder 400 should perform substantially the same processing as the move processing and the move-back processing that the HD recorder 100 performed with the SD card 300. The following points, however, are different.

(a) The HD recorder 100 in the above-mentioned embodiment used the write/read unit 116 to write data to and read data from the converted content storage unit 302, the medium-record-key storage unit 303, and the partial information storage unit 304 in the SD card 300. In the present variation, however, the HD recorder 400 uses the transmission/reception unit 311 to write data to and read data from, via the transmission/reception unit 311 in the HD recorder 500, a converted content storage unit 302, a medium-record-key storage unit 303, and a partial information storage unit 304 in the HD recorder 500.

(b) In the abovementioned embodiment, mutual authentication processing was performed between the authentication unit 115 in the HD recorder 100 and the authentication unit 301 in the SD card 300 based on the CPRM standard. In the present variation, however, mutual authentication processing is performed between the authentication unit 310 in the HD recorder 400 and the authentication unit 310 in the HD recorder 500 based on the DTCP standard.

Also, in the present variation, the converted content storage unit 302, the medium-record-key storage unit 303, and the partial information storage unit 304 are provided in the HD recorder 400 and the HD recorder 500. The converted content storage unit 302, the medium-record-key storage unit 303, and the partial information storage unit 304 may be excluded, however, and the converted content, the medium-record-key, and encrypted partial blocks may be stored on the content storage unit 104.

(13) The abovementioned devices may be computer systems structured specifically from a microprocessor, ROM, RAM, a hard disk unit, a display unit, a keyboard, a mouse, etc., whereby a computer program is stored in the RAM or the hard disk unit, and the devices achieve their functions as the microprocessor operates in accordance with the computer program. Instruction code which indicates commands to the computer is structured as a combination of multiple instruction codes since the computer program achieves predetermined functions.

(14) A portion or all of the structure elements of the above-mentioned devices may be structured as a single system LSI (Large Scale Integration). A system LSI is a super multifunctional LSI manufactured by integrating multiple structural units onto a single chip. Specifically, it is a computer system including a microprocessor, ROM, and RAM, whereby a computer program is stored in the RAM. The system LSI achieves its functions as the microprocessor operates in accordance with the computer program.

(15) A portion or all of the structure elements of the above-mentioned devices may be structured as a removable IC card or stand-alone module. The IC card or the module would be a computer system including a microprocessor, ROM, and RAM. The IC card and the module may also include the above super multifunctional LSI. The IC card and the module achieve their functions as the microprocessor operates in accordance with the computer program. This IC card or module may be tamper resistant.

(16) The present invention may be the methods shown above. Also, the present invention may be computer programs for causing computers to execute the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network acting as an internet, a data broadcast, etc.

Also, the present invention may be a computer system including a microprocessor and a memory, whereby the memory stores the computer program, and the microprocessor operates in accordance with the computer program.

Also, the present invention may be carried out by another independent computer system by transferring the program or the digital signals which have been recorded on the recording media, or by transferring the program or the digital signals via the network, etc.

(17) The above embodiment and the above variations may be combined.

As an electrical apparatus or a part of an electrical apparatus, the present invention promotes production and sales in industries which handle electrical apparatuses that record and play back digital content or industries which handle semiconductors.

The invention claimed is:

1. A content moving device for moving stored content to a portable recording medium, the content moving device comprising:
a storage unit storing original content;
a generation unit operable to perform irreversible conversion on the original content, which lowers a quality thereof, to generate converted content;
an extraction unit operable to extract partial data from the original content;
a replacing unit operable to replace a portion of the original content corresponding to the extracted partial data with different data; and
a write unit operable to write the converted content and the extracted partial data to the recording medium,
wherein the partial data is of a predetermined length and from a predetermined position of the original content,
wherein the original content includes at least intraframe-coded compressed frame images, and
wherein the extraction unit is further operable to extract part or all of the intraframe-coded compressed frame images as the partial data.

2. The content moving device of claim 1,
wherein the original content is composed of a plurality of data blocks of fixed length,
wherein the extraction unit is further operable to extract a data block from the plurality of data blocks, to determine if the extracted data block includes a part of the intraframe-coded compressed frame images, and, based on a result of the determination, to output the extracted data block as the partial data.

3. The content moving device of claim 2,
wherein the plurality of data blocks constituting the original content are generated by encrypting a digital copyrighted work per the fixed length, and
wherein the extraction unit includes:
a decryption subunit operable to decrypt the extracted data block to generate a decrypted data block; and
a judging subunit operable to determine if the decrypted data block includes a part of the intraframe-coded compressed frame images, and, based on a result of the determination, to output the extracted data block as the partial data.

4. The content moving device of claim 3,
wherein the write unit is further operable to encrypt, using a medium key of the recording medium, the decrypted data block, and to write the data block encrypted using the medium key to the recording medium.

5. The content moving device of claim 4, wherein the write unit includes:
a key holding subunit operable to hold the medium key;
an encryption subunit operable to encrypt the decoded data block using the medium key;
a write subunit operable to write the data block encrypted using the medium key and the medium key to the recording medium; and
a key erasing subunit operable to erase the medium key held in the key holding subunit.

6. The content moving device of claim 1,
wherein the extraction unit is further operable to output a position in the original content of the extracted partial data, and
wherein the write unit is further operable to write the position in the original content of the extracted partial data to the recording medium.

7. A content moving device for moving stored content to a portable recording medium, the content moving device comprising:
a storage unit storing original content;
a generation unit operable to perform irreversible conversion on the original content, which lowers a quality thereof, to generate converted content;
an extraction unit operable to extract partial data from the original content;
a replacing unit operable to replace a portion of the original content corresponding to the extracted partial data with different data;

a write unit operable to write the converted content and the extracted partial data to the recording medium;

a read unit operable to read the partial data from the recording medium having the converted content and the partial data recorded thereon;

a re-replacing unit operable to replace the replaced portion of the original content with the partial data read by the read unit; and an erase unit operable to erase the partial data and the converted content from the recording medium, wherein the storage unit is operable to store therein replaced content which is the original content in which the portion corresponding to the partial data has been replaced with different data, and wherein the content moving device is operable to move converted content recorded on the recording medium to the content moving device.

8. The content moving device of claim 7, wherein the replaced portion is of a predetermined length and from a predetermined position of the replaced content stored in the storage unit.

9. The content moving device of claim 8, wherein the replaced content is composed of a plurality of data blocks of fixed length, wherein the replaced portion corresponds to a data block from the plurality of data blocks, wherein the partial data is a single data block from the plurality of data blocks.

10. The content moving device of claim 9, wherein the recording medium has recorded thereon reencrypted data generated by decrypting the extracted partial data and encrypting the decrypted partial data using a medium key of the recording medium, wherein data blocks of the plurality of data blocks are generated by encrypting a digital copyrighted work per the fixed length, wherein the read unit is further operable to read the reencrypted data, and wherein the re-replacing unit is further operable to decrypt the reencrypted data using the medium key, to perform encryption, the encryption being the same as an encryption performed on the digital copyrighted work, on the decrypted data to generate the partial data, and to replace the replaced portion of the replaced content with the generated partial data.

11. The content moving device of claim 10, wherein the medium key is stored on the recording medium, and wherein the re-replacing unit includes:
    a key reading subunit operable to read the medium key from the recording medium;
    a decryption subunit operable to decrypt the reencrypted data using the medium key;
    an encryption subunit operable to perform encryption, the encryption being the same as the encryption performed on the digital copyrighted work, on the decrypted data to generate the partial data;
    a replacing subunit operable to replace the replaced portion with the generated partial data; and
    a key erase subunit operable to erase the medium key stored on the recording medium.

12. The content moving device of claim 7, wherein the recording medium further has stored thereon a position of the partial data in the original content, wherein the read unit further reads the position from the recording medium, and wherein the re-replacing unit replaces data at the position of the partial data of the replaced content with the read partial data.

13. A content moving method for use with a content moving device, which includes a storage unit with content stored therein, for moving the content to a portable recording medium, the content moving method comprising the steps of:
    generating converted content by performing irreversible conversion on the content, which lowers a quality thereof;
    extracting partial data, partial data being part of the content of a predetermined length, from a predetermined position of the original content;
    replacing a portion of the content corresponding to the extracted partial data with different data; and
    writing the converted content and the extracted partial data to the recording medium,
    wherein the original content includes at least intraframe-coded compressed frame images, and
    wherein the extraction unit extracts part or all of the intraframe-coded compressed frame images as the partial data.

14. A computer-readable recording medium storing a computer program used in a content moving device comprising a storage unit with content stored therein, for moving the content to a portable recording medium, the computer program for causing a computer to execute the steps of:
    generating converted content by performing irreversible conversion on the content, which lowers a quality thereof;
    extracting partial data, partial data being part of the content of a predetermined length, from a predetermined position of the original content;
    replacing a portion of the content corresponding to the extracted partial data with different data; and
    writing the converted content and the extracted partial data to the recording medium,
    wherein the original content includes at least intraframe-coded compressed frame images, and
    wherein the extraction unit extracts part or all of the intraframe-coded compressed frame images as the partial data.

15. A recording medium for use with a content moving device for moving stored content to the recording medium, the content moving device comprising:
    a storage unit storing original content;
    a generation unit operable to perform irreversible conversion on the original content, which lowers a quality thereof, to generate converted content;
    an extraction unit operable to extract partial data from the original content;
    a replacing unit operable to replace a portion of the original content corresponding to the extracted partial data with different data; and
    a write unit operable to write the converted content and the extracted partial data to the recording medium,
    wherein the partial data is of a predetermined length and from a predetermined position of the original content,
    the recording medium having recorded thereon (i) converted content generated from original content including at least intraframe-coded compressed frame images, and (ii) partial data extracted from the original content, the partial data being part or all of the intraframe-coded compressed frame images.

16. A content moving system composed of a portable recording medium and a content moving device for moving stored content to the recording medium, the content moving device including:

a storage unit storing the content;

a generation unit operable to perform irreversible conversion on the content, which lowers a quality thereof, to generate converted content;

an extraction unit operable to extract partial data, the partial data being part of the content of a predetermined length, from a predetermined position of the original content;

a replacing unit operable to replace a portion of the content corresponding to the extracted partial data with different data;

a write unit operable to write the converted content and the extracted partial data to the recording medium; and a storage area for storing therein the converted content and the partial data being provided in the recording medium, wherein the original content includes at least intraframe-coded compressed frame images, and wherein the extraction unit extracts part or all of the intraframe-coded compressed frame images as the partial data.

17. A content moving method for use with a content moving device, which includes a storage unit with content stored therein, for moving the content to a portable recording medium, the content moving method comprising the steps of:

generating converted content by performing irreversible conversion on the original content, which lowers a quality thereof, to generate converted content;

extracting partial data which is part of the original content;

replacing a portion of the original content corresponding to the extracted partial data with different data;

writing the converted content and the extracted partial data to the recording medium;

reading the partial data from the recording medium having the converted content and the partial data recorded thereon;

replacing the replaced portion with the partial data read by the read unit; and erasing the partial data and the converted content from the recording medium.

18. A computer-readable recording medium storing a computer program used in a content moving device comprising a storage unit with original content stored therein, for moving the content to a portable recording medium, the computer program for causing a computer to execute the steps of:

generating converted content by performing irreversible conversion on the original content, which lowers a quality thereof, to generate converted content;

extracting partial data which is part of the original content;

replacing a portion of the original content corresponding to the extracted partial data with different data;

writing the converted content and the extracted partial data to the recording medium;

reading the partial data from the recording medium having the converted content and the partial data recorded thereon;

replacing the replaced portion with the partial data read by the read unit; and erasing the partial data and the converted content from the recording medium.

* * * * *